T. J. M. JEWELL.
Billiard-Table Levelers.

No. 156,927. Patented Nov. 17, 1874.

Witnesses
W. M. Edwards
J. H. Matthaei.

Inventor
Tryon J. M. Jewell
per James A. Whitney
Atty

UNITED STATES PATENT OFFICE.

TRYON J. M. JEWELL, OF NEW YORK, N. Y., ASSIGNOR OF ONE-HALF HIS RIGHT TO THEODORE W. BURGER, OF PLAINFIELD, N. J.

IMPROVEMENT IN BILLIARD-TABLE LEVELERS.

Specification forming part of Letters Patent No. 156,927, dated November 17, 1874; application filed July 9, 1874.

*To all whom it may concern:*

Be it known that I, TRYON J. M. JEWELL, of the city, county, and State of New York, have invented an Improvement in Billiard-Table Legs, of which the following is a specification:

The object of this invention is to provide for the easy and convenient leveling of billiard-tables despite any inequalities or lack of level in the floor or other support upon which it is placed, and this, too, without detriment to the strength and stability of the table upon its legs, the invention consisting in certain novel combinations of parts, whereby the desired object is accomplished.

Figure 1:
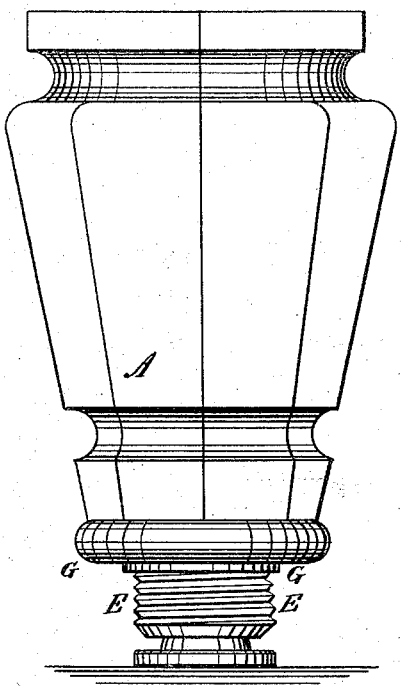
Figure 2:
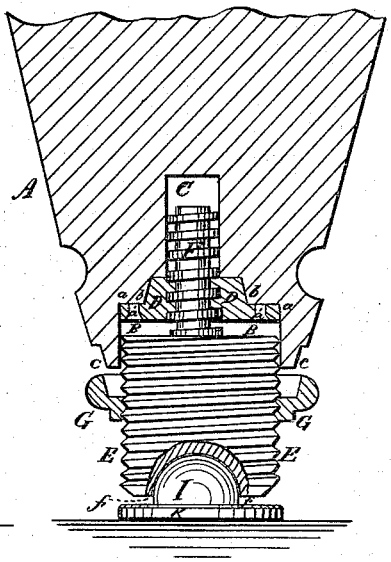

Figure 1 is a side view of a billiard-table leg constructed according to my invention, and Fig. 2 is a vertical transverse section of the same.

A is a billiard-table leg, in the bottom or lower end of which is formed a circular recess, B, above and continuous with which, and in the same axial line, is a bore, C, there being rabbets $a\ b$ between the bore and the recess to provide a seat for the fixed nut D. This latter may be secured in place by screws at $a'$, or other suitable means. E is a cylinder-screw, threaded externally, and provided centrally at its upper end with a screw, F, which works through the nut D. Upon the cylinder E is the movable nut G, which is cup-shaped at its upper side, in such manner that when screwed upward against the adjacent extremity of the leg A, leveled as shown at $c$, it will fit snugly and firmly upon and around the same, thereby preventing any possibility of the table shaking. Provided centrally in the bottom of the cylinder is a hemispherical cavity, $f$. Into this cavity $f$ is fitted the upper portion of the correspondingly-shaped bulb I, upon the bottom of which is provided the flat-bottomed flange or foot piece K, designed to rest upon the floor or other fixed support of the billiard-table.

In order to level the table upon an uneven floor, or upon one not level, it is necessary to adjust the actual length of the leg to meet the exigencies of the case. To do this the movable nut G is turned downward out of contact with the leveled portion $c$ of the leg, whereupon the cylinder E is turned in one direction or the other to lengthen or shorten the leg, as the case may be; which done to the requisite degree, the movable nut is screwed up firm to its place against the level $c$, thereby rigidly bracing the cylinder against lateral thrust, relieving in a very material degree the screw F from the downward pressure exerted by the weight upon the leg, and rendering the whole rigid and firm. Meanwhile the bulb I of the foot-plate, fitting into the hemispherical cavity $f$ of the cylinder, permits the foot-plate to adjust itself to the floor or like surface without diminishing the area of the bearing which the cylinder E has upon the bulb of the said plate.

What I claim as my invention is—

The billiard-table leveler herein described, consisting, essentially, of the cylinder E, hemispherical bulb I, the screw F, and fixed nut D, in combination with the recess B and bore C in the leg A, when all said parts are contructed and arranged substantially as and for the purpose set forth.

TRYON J. M. JEWELL.

Witnesses:
JAMES A. WHITNEY,
WILLIAM B. PHAIR.